United States Patent
Almansour

(10) Patent No.: US 9,595,184 B2
(45) Date of Patent: Mar. 14, 2017

(54) SYSTEM, METHOD, AND APPARATUS FOR INCIDENT REPORTING

(71) Applicant: Muath Khalid Almansour, Los Angeles, CA (US)

(72) Inventor: Muath Khalid Almansour, Los Angeles, CA (US)

( * ) Notice: Subject to any disclaimer, the term of this patent is extended or adjusted under 35 U.S.C. 154(b) by 1 day.

(21) Appl. No.: 14/741,187

(22) Filed: Jun. 16, 2015

(65) Prior Publication Data

US 2016/0371968 A1  Dec. 22, 2016

(51) Int. Cl.
| | |
|---|---|
| *G06F 17/00* | (2006.01) |
| *G08B 29/18* | (2006.01) |
| *G08B 25/00* | (2006.01) |
| *H04L 29/06* | (2006.01) |
| *H04L 12/18* | (2006.01) |

(52) U.S. Cl.
CPC .......... *G08B 29/185* (2013.01); *G08B 25/00* (2013.01); *H04L 12/1895* (2013.01); *H04L 63/123* (2013.01)

(58) Field of Classification Search
CPC .... G08B 25/016; G08B 21/02; G08B 25/006; H04L 12/1895; H04L 63/123; H04L 51/32; H04W 4/22; H04W 4/02; H04M 3/436
See application file for complete search history.

(56) References Cited

U.S. PATENT DOCUMENTS

| | | | |
|---|---|---|---|
| 7,091,866 B2 | 8/2006 | Nishibori | |
| 7,106,843 B1 * | 9/2006 | Gainsboro | H04M 3/2281 379/191 |
| 7,860,722 B1 * | 12/2010 | Chow | H04M 3/2281 379/88.02 |
| 2002/0116247 A1 | 8/2002 | Tucker et al. | |
| 2009/0182700 A1 | 7/2009 | Hodges | |
| 2011/0130636 A1 * | 6/2011 | Daniel | G08B 25/016 600/301 |
| 2012/0213082 A1 * | 8/2012 | Carney | H04L 63/1466 370/241 |

(Continued)

OTHER PUBLICATIONS

Citizencop, "Report an Incidence", 2014, http://www.citizencop.org/?page_id=164.

*Primary Examiner* — Hongmin Fan

(74) *Attorney, Agent, or Firm* — Oblon, McClelland, Maier & Neustadt, L.L.P.

(57) ABSTRACT

A system for reporting incidents includes at least one server having circuitry configured to receive incident report information from at least one external device including at least one of a location, environment, suspect information, victim information, and type of incident. A severity level for an incident is determined based on the incident report information, and a reporter trustworthiness score is determined based on at least one of the incident report information and reporter profile data. The circuitry receives corroboration reports from at least one additional external device when the reporter trustworthiness score is less than or equal to a predetermined trustworthiness threshold and detects a false report based on the one or more corroboration reports. Incident trends are determined based on at the incident report information and the corroboration reports, the incident report information is output based on the severity level of the incident and the incident report information.

18 Claims, 11 Drawing Sheets

(56) References Cited

U.S. PATENT DOCUMENTS

| | | | |
|---|---|---|---|
| 2013/0102271 A1 | 4/2013 | Stempski et al. | |
| 2013/0159330 A1* | 6/2013 | Smith | G06Q 10/1091 707/758 |
| 2013/0196614 A1 | 8/2013 | Pahlevani | |
| 2014/0129536 A1* | 5/2014 | Anand | G06Q 10/0635 707/706 |
| 2014/0266690 A1* | 9/2014 | McKinley | G08B 25/006 340/539.11 |
| 2014/0286484 A1* | 9/2014 | Ehrlich | H04M 3/436 379/142.06 |
| 2014/0304343 A1* | 10/2014 | Skiba | H04M 3/5175 709/206 |
| 2015/0381667 A1* | 12/2015 | Brewer | H04L 65/403 709/204 |

\* cited by examiner

| Suspicious Phone Call Data | |
|---|---|
| Phone Number | XXX-XXX-XXXX |
| Base Station Identity Code | NCC/BCC |
| Phone Call Key Words | Money, Hostage, etc. |
| Number of calls from number within predetermined time period | 1 |
| Audio File | File.wav |
| Amplifying information | Any details provided by person recording the call |

| Reporter Profile Data | |
|---|---|
| Background Check | Clear |
| Number of incidents reported per year | 20 |
| Number of false reports per year | 1 |
| Type of incidents reported | Incident categories |
| Usual report location | Latitude/Longitude |
| Report area radius | 10 miles |

SYSTEM, METHOD, AND APPARATUS FOR INCIDENT REPORTING

GRANT OF NON-EXCLUSIVE RIGHT

This application was prepared with financial support from the Saudi Arabian Cultural Mission, and in consideration therefore the present inventor has granted, the Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Timely response by appropriate authorities to reports of crimes and other types of incidents can increase safety of communities and reduce the likelihood that the perpetrator of the crime will escape. In many instances, witnesses of crimes are average citizens without law enforcement or medical expertise.

SUMMARY

In an exemplary embodiment, a system for reporting incidents includes at least one server having circuitry configured to receive incident report information from at least one external device including at least one of a location, environment, suspect information, victim information, and type of incident. A severity level for an incident is determined based on the incident report information, and a reporter trustworthiness score is determined based on at least one of the incident report information and reporter profile data. The circuitry receives corroboration reports from at least one additional external device when the reporter trustworthiness score is less than or equal to a predetermined trustworthiness threshold and detects a false report based on the one or more corroboration reports. Incident trends are determined based on at the incident report information and the corroboration reports, the incident report information is output based on the severity level of the incident and the incident report information.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7 is an exemplary illustration of suspicious phone call data, according to certain embodiments;

DETAILED DESCRIPTION

Figure 1:
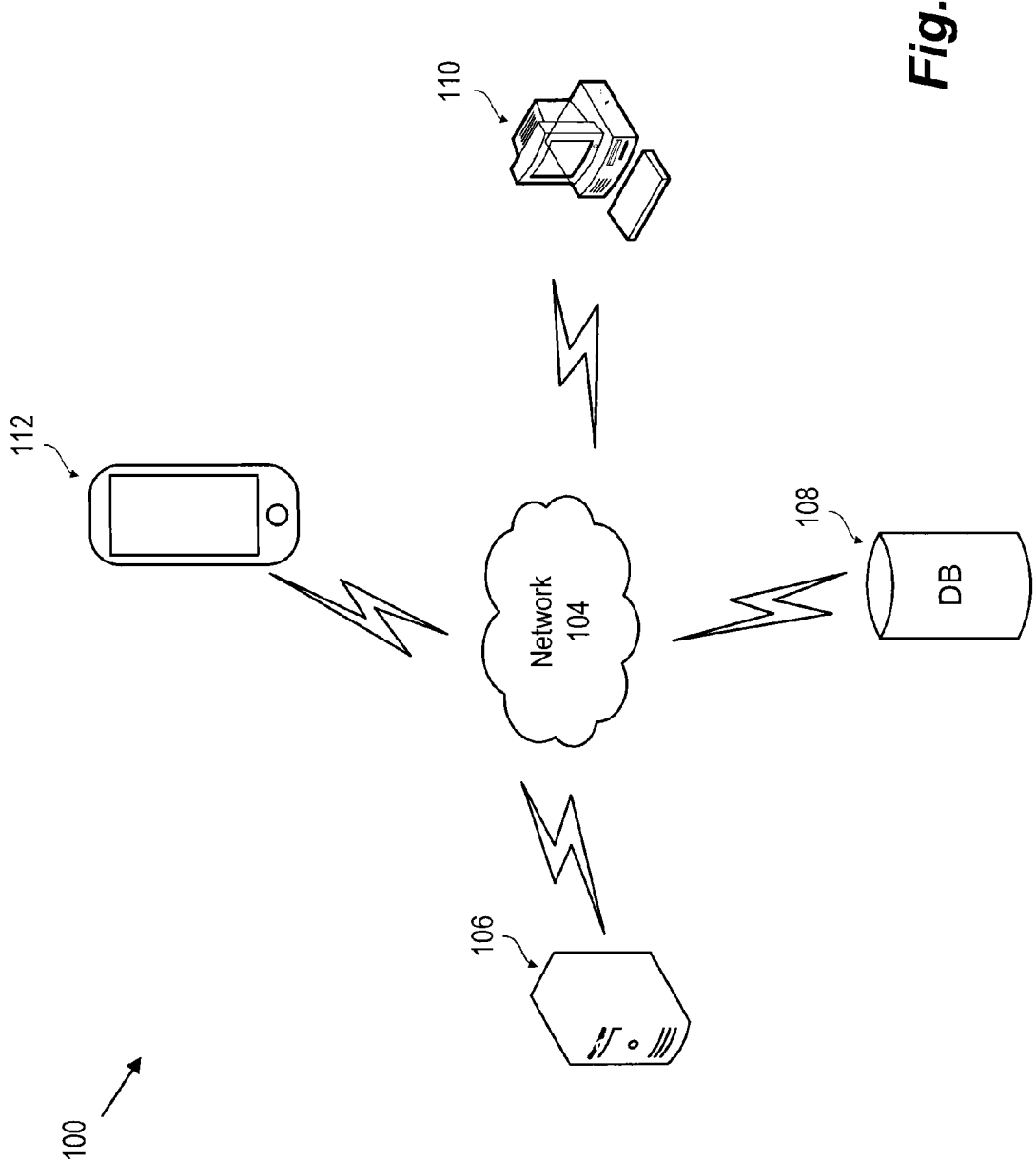
FIG. 1 is an exemplary illustration of an incident reporting system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for reporting incidents, such as crimes and/or emergencies to one or more groups of people including law enforcement personnel, emergency medical response personnel, and/or individuals in the general public. Observers of a crime can report the crime via an interface and/or application on a computer or mobile device, and the incident report information can be analyzed to determine a severity level of the reported incident. A trustworthiness of the reporter can be determined based on a reporter profile saved in a database as well as the incident data.

FIG. 1 is an exemplary illustration of an incident reporting system 100, according to certain embodiments. The computer 110 represents one or more computers 110 and acts as a client device that is connected to the server 106, the database 108, and the mobile device 112, via the network 104. In some implementations, the computer 110 is used to upload information regarding a crime or other type of incident for processing by the server 106. For example, an observer of an incident can input incident information, such as a location/environment where the incident took place, suspect information, victim information, and a type of incident to the computer 110 via a wired or wireless connection. In some implementations, the observer can upload the one or more video clips to the server 106 via the computer 110. In addition, the corroboration requests and/or incident summaries output from the server 106 can also be viewed on a screen attached to the computer 110.

The server 106 represents one or more servers connected to the computer 110, the database 108, and the mobile device 112 via the network 104. In some implementations, the processing circuitry of the server 106 receives the incident report information input to the incident reporting system 100 at the computer 110 and/or mobile device 112, determines a reporter's trustworthiness, determines a severity level for the incident report, and outputs incident summaries to one or more output destinations, such as to one or more mobile devices within a predetermined area, law enforcement agencies, emergency response agencies, news reporting agencies, and the like.

The database 108 represents one or more databases connected to the computer 110, the server 106, and the mobile device 112 via the network 104. In some implementations, the incident report data are saved in the database 108 along with the associated videos, photos, and other information associated with the incident. In addition, the database 108 can store reporter profiles of users who have created an account with the incident reporting system 100. Details regarding the incident report data and reporter profiles are discussed further herein.

The mobile device 112 represents one or more mobile devices connected to the computer 110, the server 106, and the database 108 via the network 104. The network 104 represents one or more networks, such as the Internet, connecting the computer 110, the server 106, the database 108, and the mobile device 112. The network 104 can also communicate via wireless networks such as WI-FI, BLUETOOTH, cellular networks including EDGE, 3G and 4G wireless cellular systems, or any other wireless form of communication that is known.

As would be understood by one of ordinary skill in the art, based on the teachings herein, the mobile device 112 or any other external device could also be used in the same manner as the computer 110 to input video media to the incident reporting system 100. In addition, the computer 110 and mobile device 112 can be referred to interchangeably as an external device throughout the disclosure. For example, videos recorded via a camera on the mobile device 112 can be uploaded to the server 106. In addition, the mobile device 112 can be used to view the incident summaries output from the incident reporting system 100. Details regarding the processes performed by the incident reporting system 100 are discussed further herein.

Figure 2:
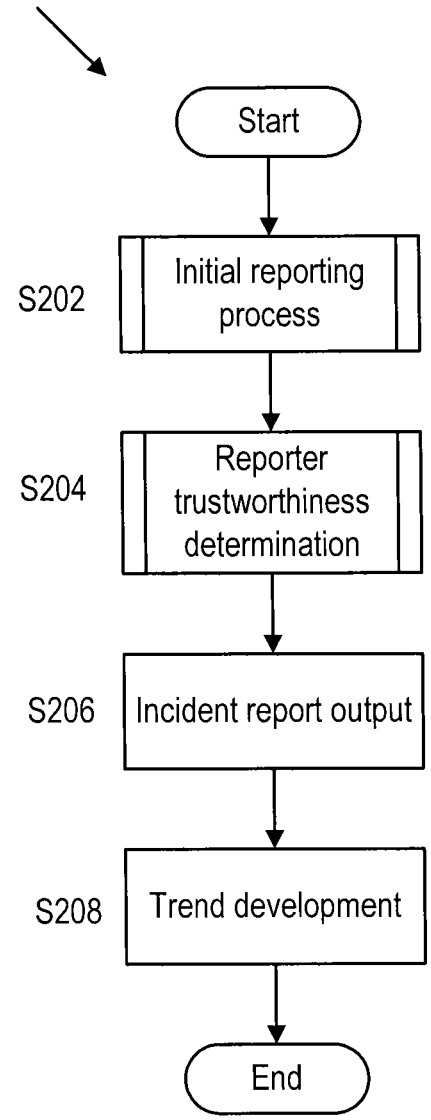
FIG. 2 is an exemplary flowchart of an incident reporting and response process, according to certain embodiments.

FIG. 2 is an exemplary flowchart of an incident reporting and response process 200, according to certain embodiments. At step S202, an initial reporting process is performed. The processing circuitry of the server 106 receives an incident report from the external device that includes details that describe the incident such as a location, environment, suspect information, victim information, and type of incident. The processing circuitry then generates an incident report vector having one or more entries that are based on the incident report information, and a severity level is determined for the incident based on the entries of the incident report vector. Details regarding the initial reporting process of step S202 are discussed further herein.

At step S204, a reporter trustworthiness determination is made. In some implementations, the processing circuitry can determine a baseline trustworthiness score of the reporter based on a reporter profile stored in the database 108. For example, the processing circuitry can use a ratio of the number of incidents reported to a number of false reports made and/or background check results to determine the reporter baseline trustworthiness score. In addition, the baseline trustworthiness score can be modified by the processing circuitry based on the incident information reported at step S202. For example, an incident trustworthiness score of the reporter can be increased by the processing circuitry if the location of the reported incident is within a predetermined radius from a location of previously reported incidents. Details regarding the reporter trustworthiness determination of step S204 are discussed further herein.

At step S206, the processing circuitry of the server 106 outputs an incident summary to one or more output destinations. In addition, the processing circuitry of the sever 106 can issue alerts to external devices in communication with base stations within a predetermined distance of the location of the incident by issuing text messages and/or alerts via an incident reporting application installed on the external devices. For mobile devices having positioning circuitry, such GPS positioning circuitry, the processing circuitry can issue the alerts based on the GPS positions of the external devices. For example, the alert messages can include a location of the reported incident, an incident summary, and a warning to remain clear of the incident location. The incident summary can include the time of occurrence of the incident, the type of incident, a description of the suspect, and the like. The incident summary can also include at least one of audio files, video files, images, and other data obtained from the scene of the incident.

According to certain embodiments, the processing circuitry can also issue alerts to one or more law enforcement agencies, emergency medical response agencies, news reporting agencies, and the like, via an interface or application on the at least one external device. For example, the processing circuitry can output the incident summaries to one or more email addresses associated with a news reporting agency. In addition, the processing circuitry of the server 106 can output the incident summaries to one or more social media accounts (e.g., TWITTER, FACEBOOK, etc.) associated with the reporter of the incident. The processing circuitry of the server 106 can also be configured to direct the incident summary toward official social media accounts of one or more law enforcement agencies, news reporting agencies, and the like via re-sharing, retweeting, etc.

In one exemplary implementation, the processing circuitry determines one or more output destinations for the incident summary based on the severity level of the incident and the incident report information. For example, for an incident involving a report of domestic violence, the processing circuitry may output the incident summary to a computer 110 associated with one or more law enforcement agencies and/or emergency medical response agencies within a predetermined radius of the location of the incident but may not output the incident summary to external devices of the general public.

At step S208, the processing circuitry of the server 106 determines one or more trends associated with the reported incident. In some implementations, the processing circuitry can access the database 108 to obtain data related to previously reported incidents as well as incident report documentation, such as police reports. For example, if a robbery is reported at a bank, the processing circuitry can determine if there have been other robberies reported within a predetermined distance surrounding the location of the reported back robbery. In some implementations, the processing circuitry of the server 106 can make recommendations to law enforcement personnel regarding recommended patrol routes based on the reported incidents. The processing circuitry can also correlate one or more incident reports as a single incident based on the incident report information. For example, if a predetermined number of entries of the incident report vectors for two or more incidents are approximately equal, then the processing circuitry can determine that the reports are for the same incident. Details regarding incident report vectors are discussed further herein.

Figure 3:
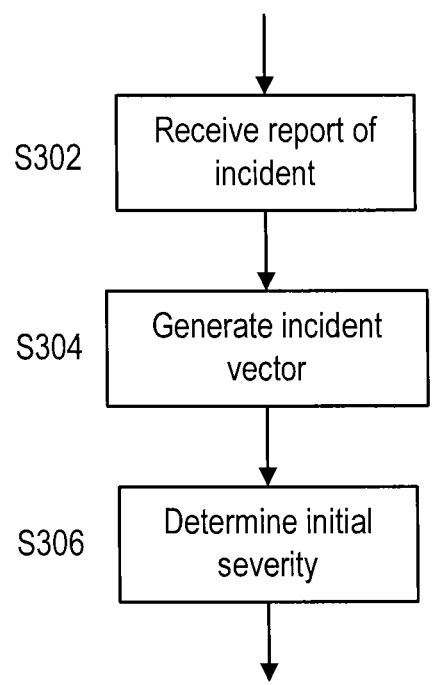
FIG. 3 is an exemplary flowchart of an initial report process, according to certain embodiments.
Figure 6:
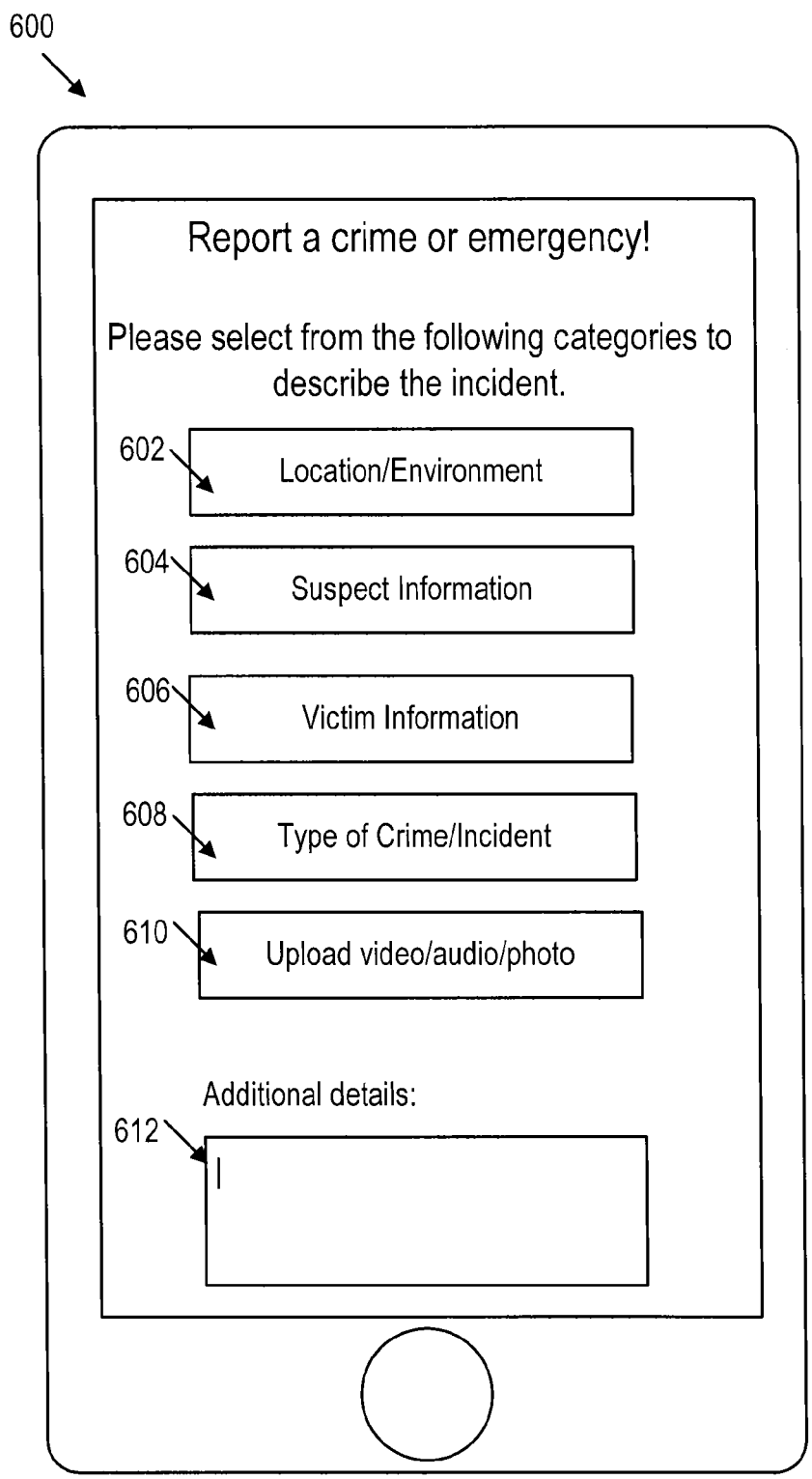
FIG. 6 is an exemplary illustration of an incident reporting interface screen, according to certain embodiments.

FIG. 3 is an exemplary flowchart of the initial reporting process of step S202, according to certain embodiments. At step S302, the processing circuitry of the server 106 receives an incident report. The incident report can include details that describe the incident such as a location, environment, suspect information, victim information, and type of incident. FIG. 6 is an exemplary illustration of an incident reporting interface screen 600, according to certain embodiments. The incident reporting interface screen 600 can include one or more categories for the reporter to select in order to provide details about the incident. The reporter can provide information associated with one or more of the categories and can also provide additional details 612 in a free text field in the incident reporting interface screen 600.

For example, the incident report can include location and/or environment information 602 about where the incident has occurred. The location of the incident can include latitude and longitude of the external device where the incident report originated based on the location determined by the GPS receiver of the external device. In some implementations, when the reporter manually inputs an approximate location of the emergency at the external device by indicating a zip code, city, neighborhood, and the like, the processing circuitry of the server 106 determines the location of the incident as a central point of the location input by the reporter. Based on the location of the external device, the processing circuitry of the server 106 can determine a location classification for the incident, such as urban, suburban, rural, remote, and the like. The processing circuitry can also determine an environment such as a highway, residence, or shopping mall as well as the amount of traffic in the vicinity of the emergency based on one or more real-time traffic reports. For example, the amount of traffic can be designated as light, moderate, or heavy based on an average speed of vehicles compared to the speed limit, traffic hazards, construction, and the like. In some implementations, the location details can be manually input by the reporter at the external device.

The incident report can also include information regarding one or more suspects 604 associated with the incident. In one implementation, the reporter of the incident can provide a written description of the one or more suspects' appearance, behavior, and the like via an interface and/or application at the external device. In addition, the suspect information interface can include one or more functions that allow the reporter to create a representation of the one or more suspects. For example, the reporter can draw via a touchscreen on the external device or select one or more physical characteristics from a selection menu. In one implementation, the reporter can select from features such as eye color, hair cut/color, facial structure, height, weight, clothing type/color. The processing circuitry of the server 106 can then generate the representation of the one or more suspects based on the written description and/or physical characteristic selections. The processing circuitry can also use the description of the one or more suspects to correlate the incident suspect with descriptions with wanted and/or previously convicted criminals.

In addition, the incident report information can also include information regarding one or more victims 606 associated with the incident. For example, the reporter can input a number of victims at the incident reporting interface screen 600 as well as the nature of any injuries that may have occurred. The incident report include a list of the type of injuries suffered by the victims as well as a severity level, such as stable, serious, or critical, which indicates a level of urgency of response associated with the injuries. For example, the serious severity level can indicate that victim is suffering from one or more injuries, such as a heart attack or severe bleeding that may require immediate medical attention. In some implementations, the critical severity level can indicate that the patient is unconscious, not breathing, and/or death appears to be imminent. The reporter can also indicate that there are no victims associated with the incident, such as when public property has been vandalized.

The incident report information can also include a type of crime and/or incident 608 that has occurred. For example, the reporter can identify the type of incident at the incident reporting interface screen 600 which can include medical emergency, car accident, burglary, auto theft, rape, assault, hostage situation, open shooter, natural disaster, and the like. The reporter can also identify one or more incident subcategories. For example, for a medical emergency incident type, the reporter can identify one or more subcategories such as head injury, chest pain, broken bones, loss of breathing, and the like.

The reporter can also upload one or more video, audio, and/or photo files 610 to the server 106 via the incident reporting interface screen 600. For example, the reporter can record video and/or audio footage of the incident that may be used by law enforcement and/or emergency medical response personnel to provide adequate personnel and resources to respond to the incident. In addition, the processing circuitry of the server 106 can output the video, audio, and/or photo files to one or more news reporting agencies and/or social media platforms so that the files can be shared with the public. In some implementations where the bandwidth of the network 104 is greater than a predetermined threshold, the reporter can stream the video and/or audio of the incident in real-time to the server 106, which may allow for faster response times by law enforcement and/or emergency response personnel. According to certain embodiments, when a person senses that a dangerous situation may be imminent, the person can preemptively activate the real-time audio or video streaming feature of the incident reporting interface screen 600 so that emergency response personnel can be immediately notified when the incident occurs.

FIG. 7 is an exemplary illustration of suspicious phone call data 700, according to certain embodiments. One type of incident report that can be received by the processing circuitry of the server 106 includes suspicious phone call reports. According to some implementations, the processing circuitry of the server 106 can receive the suspicious phone call data 700 at step S302 of the initial report process. For example, a user can indicate that the mobile device 112 has received a suspicious phone call by touching an icon on the touchscreen of the mobile device 112 or by depressing a button. In one implementation, the processing circuitry of the server 106 can receive notifications of incoming calls to the mobile device 112 and can issue a control signal to the mobile device 112 to record an incoming call when a suspicious phone number is recognized.

Upon receiving the suspicious phone call indication, the mobile device 112 can record the audio of the suspicious phone call. The mobile device 112 can transmit the suspicious phone call data 700 to the server 106 that can include the phone number of the suspicious phone call, the base station identity code (BSIC) of the base station (BS) to which the mobile device 112 is connected, number of calls from the suspicious phone number within a predetermined time period, the audio file of the suspicious phone call, and amplifying information provided by the person recording the phone call at the mobile device 112. In addition, the processing circuitry of the server 106 can execute one or more audio-to-text conversion algorithms to generate a text file of the suspicious phone call that can be saved in the database 108 along with the suspicious phone call data 700. The processing circuitry can also scan the text file for one or more keywords that can be included with the suspicious phone call data 700. Examples of keywords can include "money," "hostage," "kill," and other words that may indicate that a crime and/or incident has occurred, is presently occurring, or may occur in the future.

Referring back to FIG. 3, at step S304, the processing circuitry of the server 106 generates an incident report vector from data provided at the incident reporting interface screen 600. The incident report vector can include one or more entries that describe the incident and may include the incident report information received via the incident reporting interface screen 600. For example, the location, suspect information, victim information, and the like can be included in the incident report vector.

Figure 8:
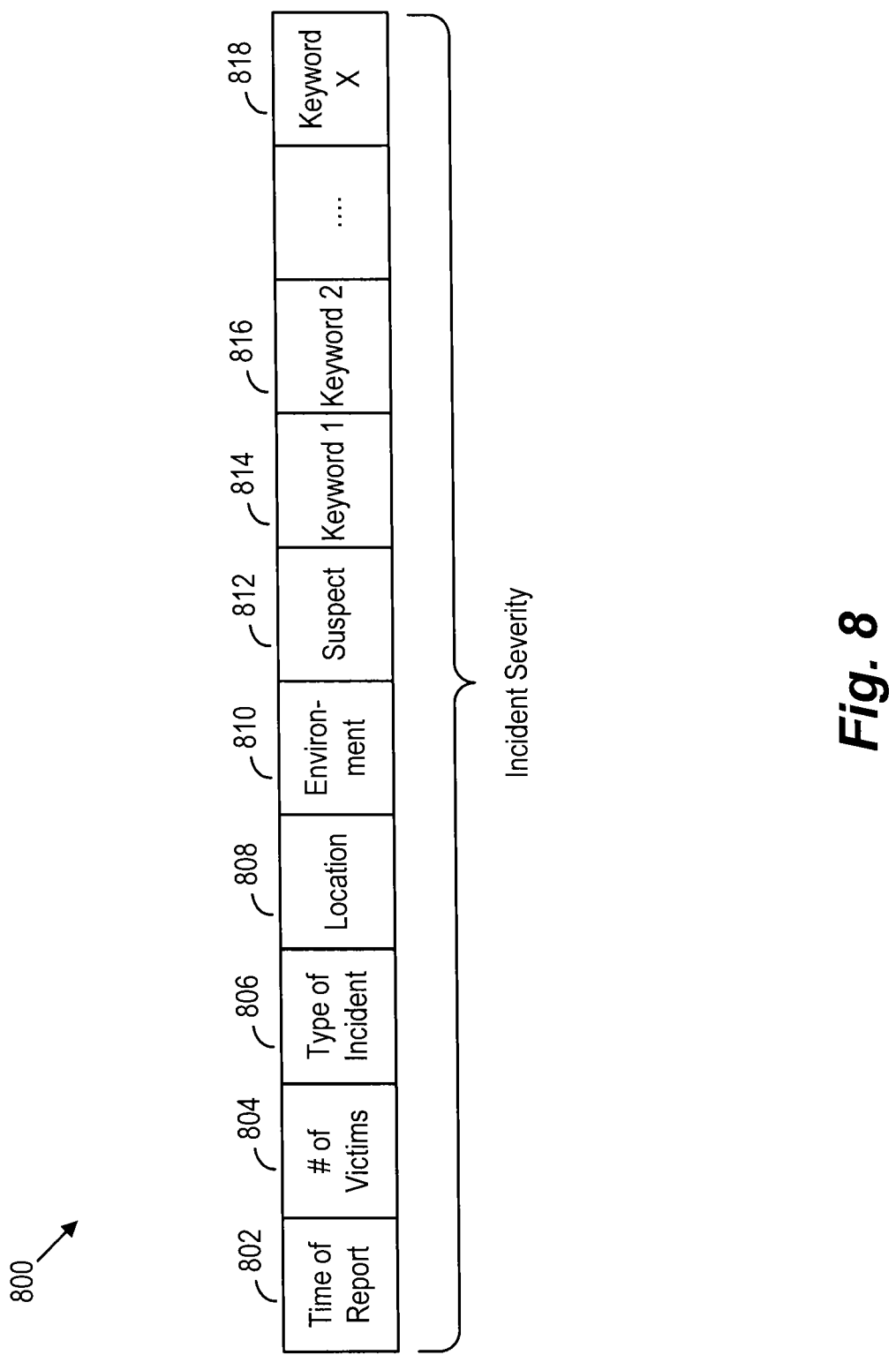
FIG. 8 is an exemplary illustration of an incident report vector, according to certain embodiments.

FIG. 8 is an exemplary illustration of an incident report vector 800, according to certain embodiments. The incident report vector 800 can include one or more entries such as a time of report 802, a number of victims 804, a type of incident 806, a location where the incident occurred 808, environment 810, suspect information 812, a first keyword 814, a second keyword 816, and one or more additional keywords 818. In other implementations, the incident report vector 800 can include greater or fewer numbers of entries. The first key word 814, second keyword 816, and one or more additional keywords 818 can include words and/or phrases that are extracted from the uploaded files that are uploaded to the server 106 by the reporter. In one embodiment, the processing circuitry can execute one or more audio-to-text conversion algorithms to generate a text file of the audio of the uploaded file that can be saved in the database 108 along with the incident report information. The processing circuitry can scan the text file for one or more keywords that may provide details associated with the incident.

For each entry in the incident report vector, the processing circuitry of the server 106 can assign a severity from 0 to 1, 1 to 100, or any other scale, based on a predetermined severity level associated with the entry. For example, the processing circuitry of the server 106 may assign a severity level of 95 to the suspect information 812 entry that indicates that the identified suspect may be on a most wanted list. In addition, the processing circuitry may assign a severity level of 20 to the suspect information 812 entry that indicates that the suspect is a 5-foot, 5-inch teenager who has stolen a candy bar from a convenience store. The severity level assignments made by the processing circuitry can be based on severity level values that are stored in the database 108.

For example, according to certain embodiments, initial severity levels for possible incident report vector entries can be input via an interface at the computer 110 and/or mobile device 112 and stored in the database 108 of the incident reporting system 100. The initial severity levels can also be based on learned trends from previously reported incidents and other incident statistics. For example, for the location 808 of the incident, initial severity levels can be based on statistical crime rates over a predetermined period of time at a particular location, such as a year and/or season. Cities, neighborhoods, and/or regions with higher crime rates may be assigned initial severity levels that are higher than locations having lower crime rates based on reported crime rate statistics. The processing circuitry of the server 106 can modify the severity levels for each entry of the incident report vector 800 based on learned trends as incidents are reported via the incident reporting system 100. Also, the processing circuitry can also use other incident statistics that are stored in the database 108 and/or accessed via a web crawling process to determine how to modify the severity levels. For example, if a crime rate of a city is reduced by 10% over one year, the processing circuitry of the server 106 may reduce the severity level associated with the city by 10% to reflect the reduction in crime rate.

In addition, the database 108 can store suspect information 812 associated with one or more previously convicted criminals. The initial severity levels associated with each criminal can be based on a number of crimes committed by the criminal, types of crimes previously committed, and the like. For example, the processing circuitry of the server 106 can assign a higher severity level to a criminal who has been convicted of 5 felonies as compared to a criminal who has committed one misdemeanor. The processing circuitry can update the suspect information 812 as data regarding additional crimes and incidents are obtained. In one exemplary implementation, if the suspect information 812 entry of the incident report vector 800 does not correspond to the suspect information 812 associated with the one or more previously convicted criminals that are stored in the database, the processing circuitry of the server 106 can assign a default severity level, such as 5, 10, or another value.

Like the location 808 entry and the suspect information 812 entry, the other entries of the incident report vector 800 have initial severity levels stored in the database 108 that are associated with all possible values of the entry. For example, for the time of report 802 entry, initial severity levels can be associated with each hour of the day based on how crime rates vary with time of day. With respect to the number of victims 804 entry, the severity level can be increased as the number of victims increases. For the type of incident 806, initial severity levels can be input that indicate how severe a law enforcement and/or emergency medical professional may judge the incident to be based on the amount of resources that may be required to respond to the incident. For the environment 810 entry, the initial severity levels can be based on crime rates and/or types of crimes committed in one or more environments. For example, bars, clubs, and other nightlife establishments may be environments that have higher initial severity levels than schools, religious buildings, libraries, and the like. The processing circuitry of the server 106 can then modify the initial severity levels based on the learned trends from the incidents reported via the incident reporting system 100.

Referring back to FIG. 3, at step S306, the processing circuitry of the server 106 determines an incident severity level based on the incident report vector 800. In some implementations, the processing circuitry determines the incident severity level by taking an average of the severity levels for each entry of the incident report vector 800. The processing circuitry can also perform a weighted average calculation based on a predetermined importance associated with the one or more entries of the incident report vector 800. For example, the type of incident 806 that has occurred may have a higher importance than the time of the report 802 so the severity level of the type of incident 806 may be weighted more heavily in the incident report severity calculation.

Figure 4:
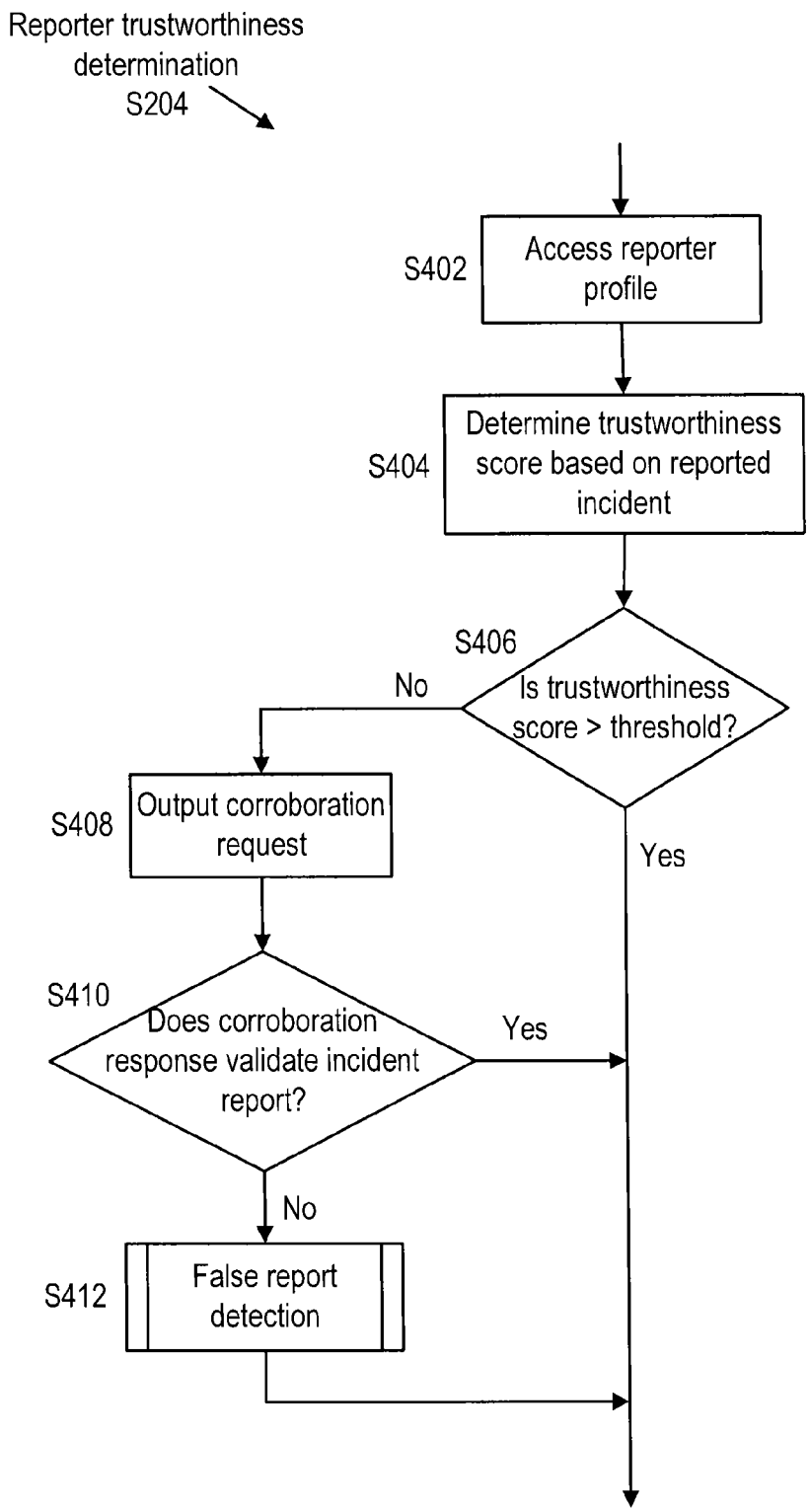
FIG. 4 is an exemplary flowchart of a reporter trustworthiness determination process, according to certain embodiments.

FIG. 4 is an exemplary flowchart of the reporter trustworthiness determination process of step S204, according to certain embodiments. At step S402, the processing circuitry of the server 106 accesses reporter profile data from the database 108 for the person submitting the initial incident report. The processing circuitry of the server 106 uses the reporter profile data to generate a baseline trustworthiness score for the reporter. The baseline trustworthiness score can be a numerical value between 0 and 100, 0 and 1, or any other type of numerical scoring system. The baseline trustworthiness score can also be a level, such as low, medium, or high. In some implementations, the reporter can create a reporter profile via an interface and/or application at the external device. For example, the reporter can input personal identification information, such as a name, date of birth, place of birth, social security number, and the like, which can be used by the processing circuitry to perform a background check of the reporter. For example, the processing circuitry can access law enforcement records to determine criminal history, number of traffic infractions, and other types of events that may affect the trustworthiness of the reporter.

Figure 9:
FIG. 9 is an exemplary illustration of reporter profile data, according to certain embodiments.

FIG. 9 is an exemplary illustration of reporter profile data 900, according to certain embodiments. For example, the reporter profile data 900 can include results of the background check, total number of incidents reported within a predetermined period of time such as a year, number of false reports made within the predetermined period of time, types of incidents reported, a usual report location, and a report area radius. For example, the processing circuitry can determine the usual report location to be a latitude and longitude point that represents a central point of one or more previously reported incidents. In addition, the processing circuitry can identify outlier locations and exclude the outliers from the central point determination. The processing circuitry of the server 106 can also determine the report area radius based on an average distance from the usual report location to the locations of the one or more previously reported incidents. In addition, the number of false reports during the predetermined time period is the number of reports that have not been corroborated by a more trusted reporter. Details regarding false reports and report corroboration are discussed further herein.

Referring back to FIG. 4, at step S404, the processing circuitry of the server 106 determines an incident trustworthiness score for the reporter based on the reporter profile data 900 and the reported incident. The incident trustworthiness score can be a numerical value between 0 and 100, 0 and 1, or any other type of numerical scoring system. The trustworthiness score can also be a level, such as low, medium, or high. In one implementation, the processing circuitry of the server 106 can modify the baseline trustworthiness score of the reporter based on the incident report information to determine the incident trustworthiness score. For example, if the location of the incident lies within the report area radius from the usual report location for the reporter, than the incident trustworthiness score can be increased. Likewise, the incident trustworthiness score can be decreased if the location of the incident lies outside the report area radius from the usual report location. In addition, the incident trustworthiness score can also be increased or decreased based on whether the type of incident reported is one of the types of previously reported incidents from the reporter profile data 900.

At step S406, the processing circuitry determines whether the incident trustworthiness score is greater than a predetermined trustworthiness threshold. The predetermined incident trustworthiness threshold may be based on the type of incident being reported and the incident severity level of the corresponding incident report vector. For example, incidents where a loss of life has occurred may have a higher severity level than incidents where no injuries are reported. Incidents having higher severity levels may have higher predetermined trustworthiness thresholds. If the incident trustworthiness score is greater than the predetermined threshold, resulting in a "yes" at step S406, then step S206 of the incident reporting and response process 200 is performed. Otherwise, if the incident trustworthiness score is less than or equal to the predetermined threshold, resulting in a "no" at step S406, then step S408 is performed.

At step S408, the processing circuitry of the server 106 outputs at least one corroboration request to at least one user having an incident trustworthiness score greater than the predetermined threshold if the reporter incident trustworthiness score is less than or equal to the predetermined threshold. The processing circuitry can access a list of trusted reporters and associated baseline trustworthiness scores from the database 108. The processing circuitry can then determine incident trustworthiness scores for the trusted reporters and can output a corroboration request to at least one of the trusted reporters whose incident trustworthiness score is greater than the predetermined threshold.

Figure 10:
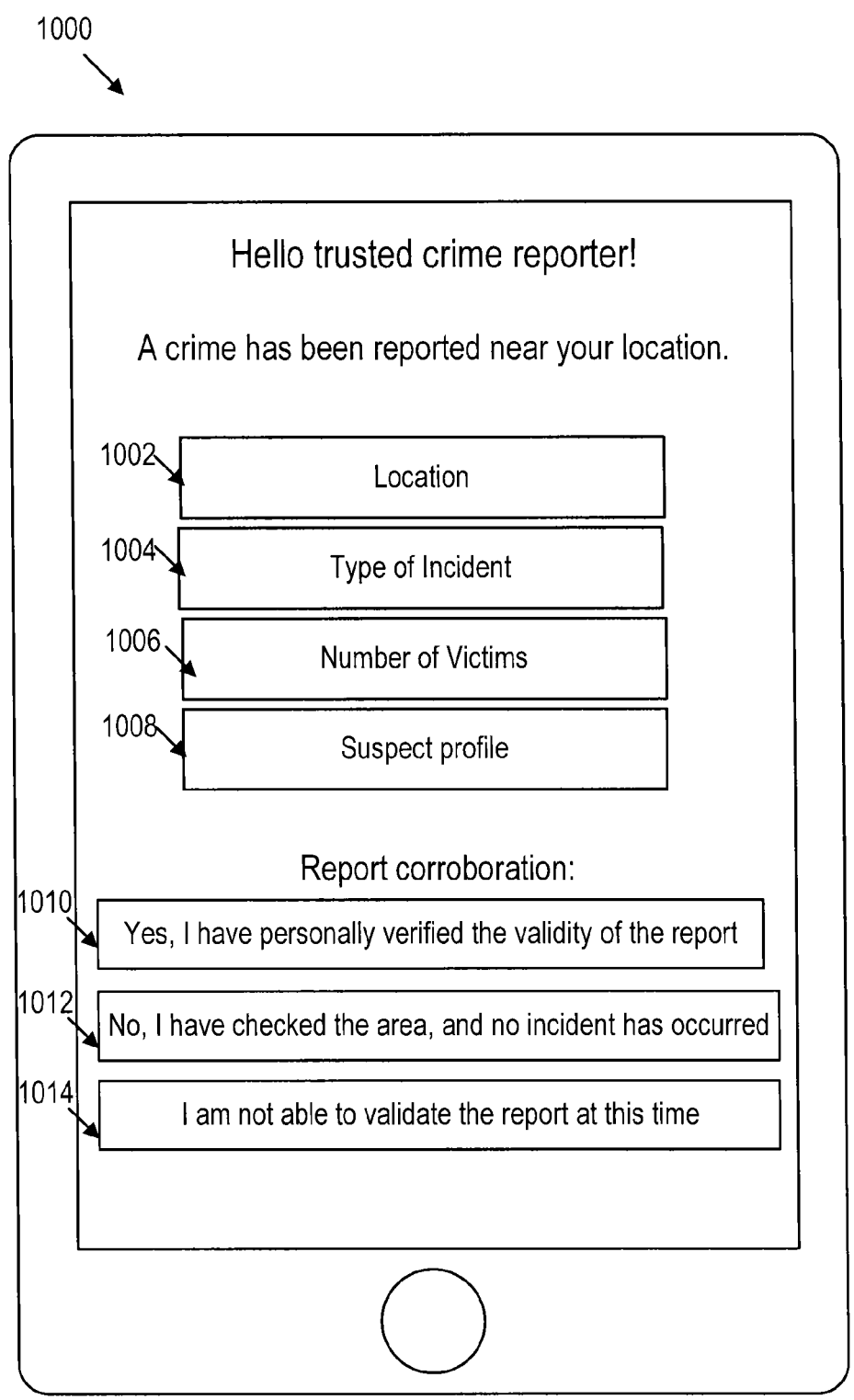
FIG. 10 is an exemplary illustration of corroboration request interface screen, according to certain embodiments.

FIG. 10 is an exemplary illustration of corroboration request interface screen 1000, according to certain embodiments. The processing circuitry of the server 106 can output the corroboration request to the external device of the at least one trusted reporter via the corroboration request interface screen 1000. In some implementations, the processing circuitry issues an alert to the external device associated with a trusted reporter, and the trusted reporter can view the corroboration request interface screen 1000 via an application on the external device. The corroboration request interface screen can include one or more components of the incident report information, such as the location 1002, type of incident 1004, number of victims 1006, and/or suspect profile 1008. The trusted reporter can then use the incident report information to determine whether the reported incident has occurred.

The trusted reporter can provide corroboration report feedback to the server 106 via one or more selections at the corroboration request interface screen 1000. For example, the trusted reporter can select "Yes, I have personally verified the validity of the report" 1010 if the incident report was valid. If the trusted reporter determines that the incident report was invalid, then "No, I have checked the area and no incident has occurred" 1012 can be selected. In addition, if the trusted reporter is unable to perform a validation of the incident report, then "I am not able to validate the report at this time" 1014 can be selected at the corroboration request interface screen 1000.

Referring back to FIG. 4, at step S410 determines whether the corroboration response validates the incident report received at step S202 of the incident reporting and response process 200. For example, a response of "Yes, I have personally verified the validity of the report" 1010, at the corroboration request interface screen 1000 can indicate that the incident report has been validated. If the corroboration response validates the incident report, resulting in a "yes" at step S410, then step S206 of the incident reporting and response process 200 is performed. Otherwise, if the corroboration response invalidates the incident report, resulting in a "no" at step S406, then step S412 is performed. For example, a response of "No, I have checked the area, and no incident has occurred" 1012 can indicate that a false report may have occurred.

Figure 5:
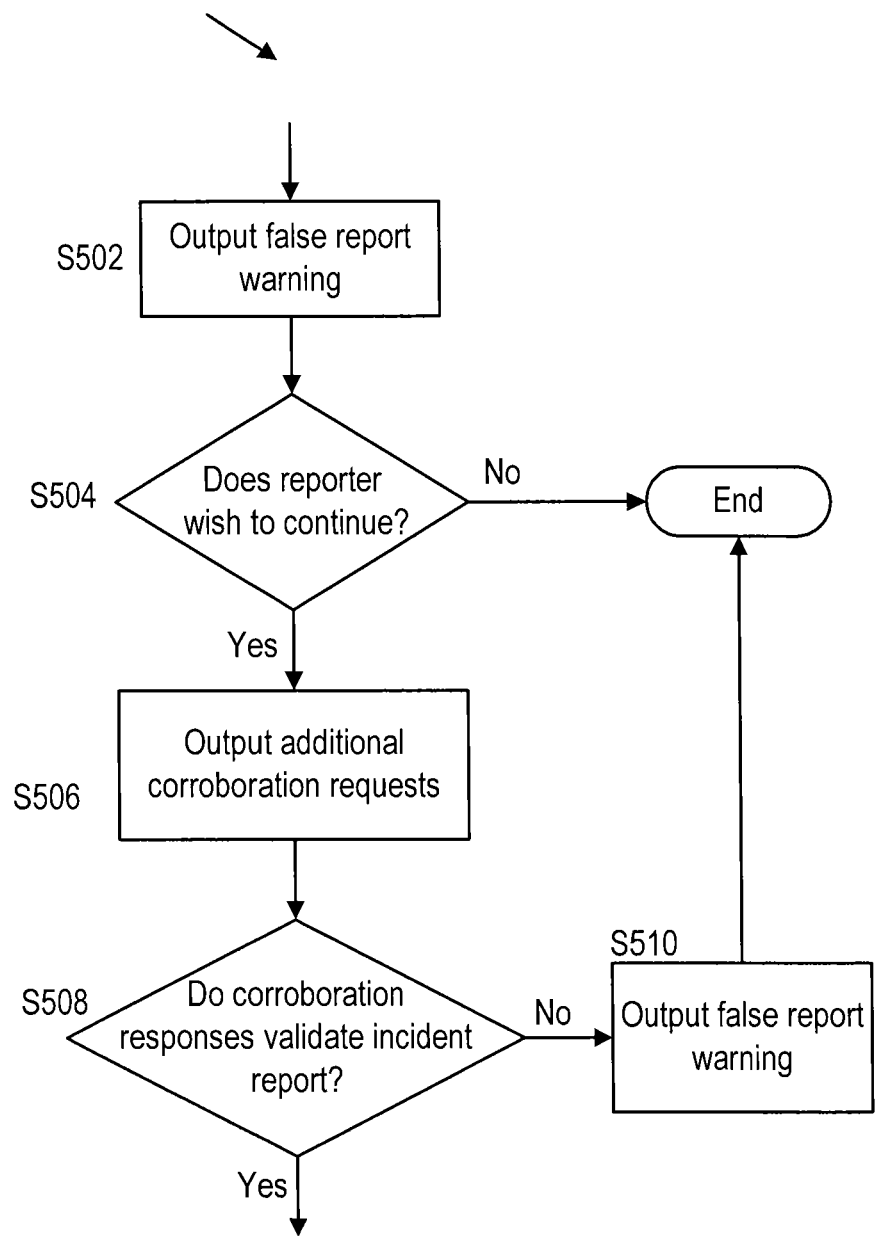
FIG. 5 is an exemplary flowchart of a false report detection process, according to certain embodiments.

At step S412, the processing circuitry of the server 106 performs a false report detection process. According to certain embodiments, a false report occurs when the server 106 receives an incident report of a crime or other type of incident that did not actually occur. FIG. 5 is an exemplary flowchart of the false report detection process of step S412, according to certain embodiments. At step S502, the processing circuitry of the server 106 outputs a false report warning to the external device associated with the initial report. The false report warning can indicate that the report was not validated by a trusted reporter. The server 106 can then receive a response from the reporter regarding whether the reporter wants to continue asserting that the incident has occurred.

At step S504, the processing circuitry determines whether the reporter of the incident wishes to continue asserting that the incident has occurred. If the reporter of the incident wishes to continue asserting that the incident has occurred, resulting in a "yes" at step S504, then step S506 is performed. Otherwise, if the reporter of the incident does not wish to continue asserting that the incident has occurred, resulting in a "no" at step S504, the incident reporting and response process 200 is terminated. For example, the reporter may have inadvertently activated the incident reporting interface screen 600 and may wish to terminate the process.

At step S506, the processing circuitry of the server 106 outputs additional corroboration requests to at least one user having an incident trustworthiness score greater than the predetermined threshold. In some implementations, the number of additional corroboration requests output by the processing circuitry is based on the incident severity level. For example, the processing circuitry may output three additional corroboration requests for an incident severity level of 75 to 100, two additional corroboration requests for an incident severity level of 25 to 74, and one additional corroboration request for an incident severity level of 0 to 24.

At step S508 determines whether the additional corroboration responses validate the incident report received at step S202 of the incident reporting and response process 200. If one or more of the additional corroboration response validates the incident report, resulting in a "yes" at step S508, then step S206 of the incident reporting and response process 200 is performed. Otherwise, if at least one corroboration response does not validate the incident report, resulting in a "no" at step S508, then step S510 is performed. If the one or more additional corroboration responses conflict with one another, the processing circuitry of the server 106 can output more additional corroboration requests so until a predetermined number of matching corroboration responses are received.

At step S510, the processing circuitry outputs a false report warning to the at least one external device, and the incident reporting and response process 200 is terminated. The false report warning can indicate that the report was not validated by one or more additional trusted reporters and that the incident report is considered to be a false report. The processing circuitry of the server 106 can then update the reporter profile data 900 to indicate that a false report has occurred.

A hardware description of server 106 according to exemplary embodiments is described with reference to FIG. 11. In addition, the hardware described by FIG. 11 can also apply to the computer 110 and the mobile device 112. The processes can also be performed by processing circuitry of a server 106 designed and programmed specifically to optimally execute the incident reporting and response process 200 and other processes used by the incident reporting system 100. Implementation of the processes of the incident reporting system 100 on the hardware described herein improves the ability of law enforcement agencies, emergency medical response agencies, and the like to respond to crimes and other types of emergencies by streamlining the processing of incident reports reported by witnesses of the incidents. In addition, the incident reporting system 10 increases the speed and efficiency of issuing corroboration requests to validate incident reports and detecting false reports. In addition, the processes described herein can also be used in other applications, such as in the academic or corporate environment where personnel can report accomplishment of tasks that can be validated by other more trusted personnel.

The server 106 includes a CPU 1100 that perform the processes described herein. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 106 communicates, such as the computer 110.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

Figure 11:
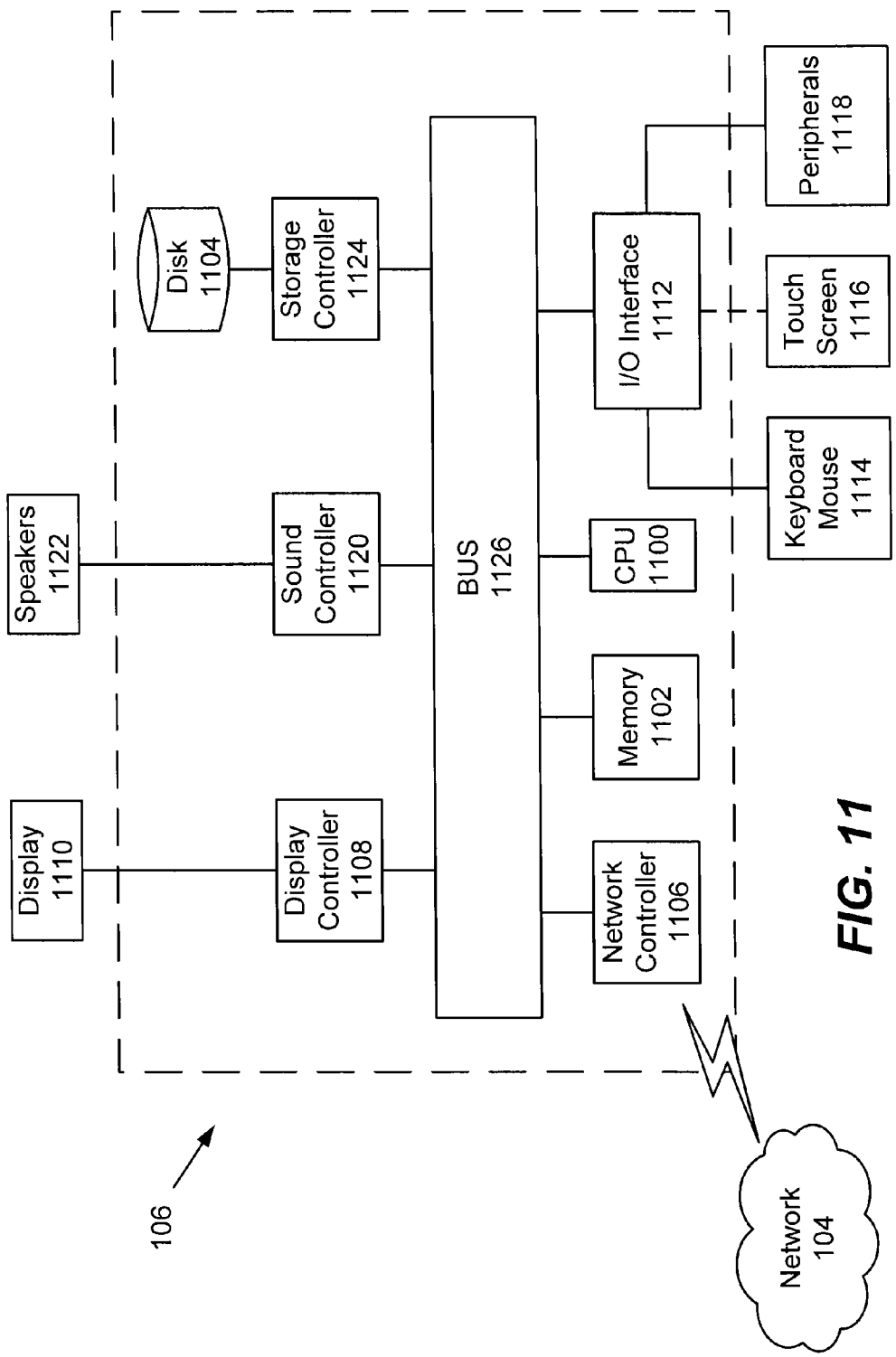
FIG. 11 illustrates a non-limiting example of a server, according to certain embodiments.

The server 106 in FIG. 11 also includes a network controller 1106, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 106 further includes a display controller 1108, such as a NVIDIA GeForce GTX or Quadro graphics adaptor from NVIDIA Corporation of America for interfacing with display 1110 of the server 106 and the computer 110, such as a Hewlett Packard HPL2445w LCD monitor. A general purpose I/O interface 1112 at the server 106 interfaces with a keyboard and/or mouse 1114 as well as a touch screen panel 1116 on or separate from display 1110. General purpose I/O interface 1112 also connects to a variety of peripherals 1118 including printers and scanners, such as an OfficeJet or DeskJet from Hewlett Packard.

A sound controller 1120 is also provided in the server 106, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the server 106. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

In other alternate embodiments, processing features according to the present disclosure may be implemented and commercialized as hardware, a software solution, or a combination thereof. Moreover, instructions corresponding to the incident reporting and response process 200 in accordance with the present disclosure could be stored in a thumb drive that hosts a secure process.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system for reporting incidents comprising:
at least one server having circuitry configured to
receive incident report information of an incident report from at least one external device including at least one of a location, environment, suspect information, victim information, and type of incident,
determine a severity level for an incident based on the incident report information,
determine a reporter trustworthiness score based on at least one of the incident report information and reporter profile data,
receive one or more corroboration reports from at least one additional external device when the reporter trustworthiness score is less than or equal to a predetermined trustworthiness threshold,
detect a false report based on the one or more corroboration reports,
determine one or more incident trends based on at least one of the incident report information and the one or more corroboration reports, and
output the incident report information based on the severity level of the incident and the incident report information,
wherein the circuitry is further configured to output a false report warning to the at least one external device when the one or more corroboration reports invalidate the incident report,
wherein the circuitry determines a number of additional corroboration requests to output based on the severity level of the incident report.

2. The system of claim 1, wherein the circuitry is further configured to receive a suspicious phone call file from the at least one external device.

3. The system of claim 2, wherein the circuitry is further configured to determine at least one of a phone number and a base station identity code (BSIC) for the suspicious phone call.

4. The system of claim 3, wherein the circuitry is further configured to determine a number of times the external device has received a call from the phone number within a predetermined time period.

5. The system of claim 2, wherein the circuitry is further configured to determine one or more key words from the suspicious phone call.

6. The system of claim 2, wherein the circuitry is further configured to issue a control signal to the at least one external device to initiate recording of a phone call when a suspicious phone number is recognized.

7. The system of claim 1, wherein the circuitry is further configured to generate an incident report vector from the incident report information.

8. The system of claim 7, wherein the circuitry is further configured to determine the severity level for the incident based on one or more entries of the incident report vector.

9. The system of claim 1, wherein the circuitry is further configured to increase the reporter trustworthiness score when the location of the incident report is within a predetermined radius from a usual report location.

10. The system of claim 1, wherein the circuitry is further configured to increase the reporter trustworthiness score when the type of incident corresponds to types of previously reported incidents.

11. The system of claim 1, wherein the circuitry is further configured to output one or more additional corroboration requests when the false report is detected.

12. The system of claim 1, wherein the circuitry is further configured to receive at least one of videos and images associated with the incident report information.

13. The system of claim 12, wherein the circuitry is further configured to receive real-time streaming videos of an incident occurrence when a network bandwidth is greater than a predetermined threshold.

14. The system of claim 1, wherein the circuitry is further configured to correlate two or more incident reports based on the incident report information.

15. The system of claim 1, wherein the circuitry is further configured to determine incident trends for one or more locations based on a number of reported incidents over a predetermined period of time.

16. The system of claim 1, wherein the circuitry is further configured to output the incident report information to one or more devices associated with at least one of law enforcement agencies, emergency medical response agencies, and news reporting agencies within a predetermined area.

17. A method for incident reporting comprising:
receiving, from at least one external device, incident report information of an incident report including at least one of a location, environment, suspect information, victim information, and type of incident;
determining, at at least one server, a severity level for an incident based on the incident report information;
determining, at the at least one server, a reporter trustworthiness score based on at least one of the incident report information and reporter profile data;
receiving, from at least one additional external device, one or more corroboration reports when the reporter trustworthiness score is less than or equal to a predetermined trustworthiness threshold;

detecting, at the at least one server, a false report based on the one or more corroboration reports;

determining, at the at least one server, one or more incident trends based on at least one of the incident report information and the one or more corroboration reports; and outputting, from the at least one sever, the incident report information based on the severity level of the incident and the incident report information, wherein the circuitry is further configured to output a false report warning to the at least one external device when the one or more corroboration reports invalidate the incident report;

wherein the circuitry determines a number of additional corroboration requests to output based on the severity level of the incident report.

18. A non-transitory computer-readable medium having computer-readable instructions thereon which when executed by a computer cause the computer to perform a method for incident reporting, the method comprising:

receiving incident report information of an incident report from at least one external device including at least one of a location, environment, suspect information, victim information, and type of incident;

determining a severity level for an incident based on the incident report information;

determining a reporter trustworthiness score based on at least one of the incident report information and reporter profile data;

receiving one or more corroboration reports when the reporter trustworthiness score is less than or equal to a predetermined trustworthiness threshold;

detecting a false report based on the one or more corroboration reports;

determining, at the at least one server, one or more incident trends based on at least one of the incident report information and the one or more corroboration reports;

outputting the incident report information based on the severity level of the incident and the incident report information; and outputting a false report warning to the at least one external device when the one or more corroboration reports invalidate the incident report;

wherein the circuitry determines a number of additional corroboration requests to output based on the severity level of the incident report.

* * * * *